United States Patent
Ott et al.

(10) Patent No.: US 7,897,103 B2
(45) Date of Patent: *Mar. 1, 2011

(54) METHOD FOR MAKING AND USING A ROD ASSEMBLY

(75) Inventors: Eric Allen Ott, Cincinnati, OH (US); Andrew Philip Woodfield, Cincinnati, OH (US); Clifford Earl Shamblen, Blue Ash, OH (US); Peter Wayte, Maineville, OH (US); Mike Eugene Mechley, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 48 days.

This patent is subject to a terminal disclaimer.

(21) Appl. No.: 11/140,636

(22) Filed: May 27, 2005

(65) Prior Publication Data

US 2005/0223849 A1    Oct. 13, 2005

Related U.S. Application Data

(63) Continuation-in-part of application No. 10/329,140, filed on Dec. 23, 2002.

(51) Int. Cl.
*B22F 3/02* (2006.01)
(52) U.S. Cl. ............................. 419/66; 148/513
(58) Field of Classification Search ............... 419/4, 66; 148/513
See application file for complete search history.

(56) References Cited

U.S. PATENT DOCUMENTS

| | | | |
|---|---|---|---|
| 3,736,132 A | 5/1973 | Easterday et al. | |
| 4,023,989 A * | 5/1977 | Dobo | 419/4 |
| 4,253,933 A | 3/1981 | Sato et al. | |
| 4,534,935 A | 8/1985 | Ambrose et al. | |
| 4,799,975 A | 1/1989 | Ouchi et al. | |
| 4,844,746 A | 7/1989 | Hormann et al. | |
| 5,000,910 A | 3/1991 | Tokizane et al. | |
| 5,026,520 A | 6/1991 | Bhowal et al. | |
| 5,322,666 A | 6/1994 | Watwe | |
| 5,373,529 A | 12/1994 | Zanner et al. | |
| 5,772,724 A | 6/1998 | Inoue et al. | |
| 5,911,102 A | 6/1999 | Takahashi et al. | |
| 5,930,580 A | 7/1999 | Everett | |
| 5,980,655 A | 11/1999 | Kosaka | |
| 6,001,495 A | 12/1999 | Bristow et al. | |
| 6,454,882 B1 | 9/2002 | Martin | |
| 6,521,173 B2 | 2/2003 | Kumar et al. | |
| 6,561,259 B2 | 5/2003 | Spadafora et al. | |
| 6,569,270 B2 | 5/2003 | Segal | |
| 6,582,651 B1 | 6/2003 | Cochran, Jr. et al. | |
| 6,737,017 B2 | 5/2004 | Woodfield et al. | |
| 2002/0068005 A1 | 6/2002 | Meyer et al. | |

(Continued)

FOREIGN PATENT DOCUMENTS

GB             500504          *  2/1939

(Continued)

*Primary Examiner* — George Wyszomierski
*Assistant Examiner* — Weiping Zhu
(74) *Attorney, Agent, or Firm* — McNees Wallace & Nurick, LLC

(57) ABSTRACT

An elongated rod assembly is made by preparing a plurality of rods. Each rod is prepared by the steps of furnishing at least one nonmetallic precursor compound, thereafter chemically reducing the precursor compounds to produce the metallic material, and thereafter consolidating the metallic material to form the rod, wherein the rod has a rod length equal to the assembly length. The rods are bundled together to form a bundled rod assembly. The rod assembly may be used as a consumable feedstock in a melting-and-casting operation.

26 Claims, 2 Drawing Sheets

| U.S. PATENT DOCUMENTS | | | | FOREIGN PATENT DOCUMENTS | | |
|---|---|---|---|---|---|---|
| 2002/0073804 A1 | 6/2002 | Meiss | | GB | 883 429 A | 11/1961 |
| 2003/0230170 A1 | 12/2003 | Woodfield et al. | | JP | 1184239 | 7/1989 |
| 2003/0231974 A1 | 12/2003 | Woodfield et al. | | | | |
| 2004/0016319 A1 | 1/2004 | Woodfield et al. | | | | |
| 2004/0096350 A1 | 5/2004 | Moxson et al. | | | | |
| 2004/0115085 A1 | 6/2004 | Steibel et al. | | * cited by examiner | | |

METHOD FOR MAKING AND USING A ROD ASSEMBLY

This application is a continuation in part of co-pending application Ser. No. 10/329,140, filed Dec. 23, 2002, for which priority is claimed and whose disclosure is incorporated by reference.

This invention relates to the production of elongated rod assemblies and further to the use of the rod assemblies in applications such as feedstock in a melting-and-casting operation, or direct compaction.

BACKGROUND OF THE INVENTION

In one conventional practice called vacuum arc remelt (VAR), titanium alloys are prepared by furnishing the starting metallic materials in the form of virgin metal, revert metal, scrap, and the like. These starting metallic materials are cut into smaller pieces as necessary, and welded together to form an elongated, irregularly shaped consumable electrode. The consumable electrode is loaded into a vacuum arc melting furnace, and a vacuum is drawn. An electrical arc is struck between the vertically oriented consumable electrode and the interior of a crucible, while under vacuum. The arc melts the end of the electrode, and the molten metal falls into the crucible to form a molten pool. In the case of a cold-crucible melting technique, the arc is continued, and the electrode is gradually fed into the crucible as the metal is progressively melted from the end of the electrode at which the arc is struck and solidifies progressively during melting. If the melted metal is to be cast, when the volume of metal in the crucible is sufficient, it is cast into a mold and solidified. The casting may serve as a final product or as a remelt material, because there may be multiple remelts of the metal to achieve sufficient homogeneity. There are other melting technologies, but most use a consumable electrode during the early stages of melting, and in each case the consumable electrode is prepared by welding the starting metallic materials together.

This type of approach, while widely practiced, has some significant shortcomings and limitations. The cutting and welding of the starting metallic materials are labor intensive and expensive. There is a wide variety in the form and chemistry of the starting metallic materials. The chemistry of the consumable electrode varies greatly over its length, so that the composition of the metal being melted at any moment locally varies greatly as the consumable electrode is fed into the molten pool. There may also be impurity pickup during handling and welding of the consumable electrode. Debris may accumulate in the relatively large surface crevices and be carried into the melt. Mechanical and chemical irregularities present in the starting metallic material may not be eliminated during the melting operation, so that the final product has at least a remnant of the irregularities.

The welding of the starting metallic materials into the irregular but generally rodlike form of the consumable electrode must be performed with great care. The weld may have associated irregularities, such as oxide particles if the welding is performed in air. If a transverse weld joint is understrength, the entire end of the consumable electrode below the weld joint may drop off into the molten pool, interrupting the melting operation and possibly damaging the melting equipment. And even if the transverse welds are sound, they have an associated electrical resistance such that the electrical current flowing through the consumable electrode may cause one of the welds to heat and fail, again causing all of the consumable electrode below the failed weld to fall into the molten pool.

In yet other cases, there is simply no way to manufacture a rod of some materials in a form suitable for use as a consumable electrode.

There is a need for an improved approach to the fabrication of consumable electrodes. Many of the same problems are also observed in other types of elongated rodlike structures. The present approach provides a solution to the problems associated with the present technology, and further provides related advantages.

SUMMARY OF THE INVENTION

The present invention provides a method for preparing an elongated rod assembly of a metal. The rod assembly may be used as a consumable electrode in melting operations, or it may be used for other applications requiring a rodlike form. Compositional irregularities along the length of the rod assembly are reduced and largely avoided, as compared with prior approaches, and the physical form of the rod is more uniform than that of prior approaches. There are no transverse welds in the region that is melted during the consumable-electrode melting process that may fail during subsequent melting, greatly reducing the possibility that the rod assembly may fail so that a large chunk of metal falls into the molten pool.

A method for making an elongated rod assembly having an assembly length and made of a metallic material includes preparing at least two rods. Each rod is prepared by furnishing at least one nonmetallic precursor compound, thereafter chemically reducing the precursor compounds to produce the metallic material, and thereafter consolidating the metallic material to form the rod. The rods are bundled together in a side-by-side fashion having the assembly length to form the bundled rod assembly.

The present approach may be applied to any pure metal or metallic alloy, but the most preferred metals are nickel-base materials, iron-base materials, cobalt-base materials, and titanium-base materials.

The steps of furnishing, chemically reducing, and consolidating may be performed without melting the metallic material, so that there is no melting of the rods and the metallic material prior to the completion of the step of bundling. All or some of the metallic material may instead be melted at some point prior to the completion of the step of bundling. The bundle may include at least some material that has not been previously melted, but may also include some secondary metallic material that has been previously melted. The secondary metallic material that has been previously melted, such as revert material, scrap, or virgin metal such as master alloy, may be consolidated with the other material to form the rods, which are then bundled, or the secondary material may be furnished as separate rods that are then bundled with the other rods to form the bundle.

The rod assembly may be in a bundled-but-unjoined form. More preferably, concurrently with or after the step of bundling the rods are joined to retain the rods in the form of the bundled rod assembly. The rods may be joined by any operable approach. In one approach, the rods are joined together along their lateral surfaces, for example by welding. In another, the rods are mechanically affixed together at one or both of their ends and/or at intermediate locations along their lengths.

In an application of particular interest, the elongated rod assembly, prepared as described above, is melted. For use as a consumable electrode in a melting operation or a melting-and-casting operation, the rod assembly is progressively melted starting from an end of the rod assembly. The melting may be accomplished by striking an arc from the end of the rod assembly.

Thus, in one embodiment, a method for making an elongated rod assembly having an assembly length comprises preparing a plurality of rods. Each rod is prepared by the steps of furnishing at least one nonmetallic precursor compound, thereafter chemically reducing the precursor compounds to produce the metallic material, and thereafter consolidating the metallic material to form the rod, wherein the rod has a rod length equal to the assembly length. The rods are bundled together to form a bundled rod assembly, and the rod assembly is utilized as a consumable feedstock in a melting-and-casting operation. Other operable features discussed herein may be used with this embodiment.

The rod assembly may instead or additionally be further processed, as by hot isostatic pressing, extrusion, rolling, or the like. In this case, it is preferred that the rods that are assembled for further processing, and the bundled rod assembly, be made of unmelted material.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
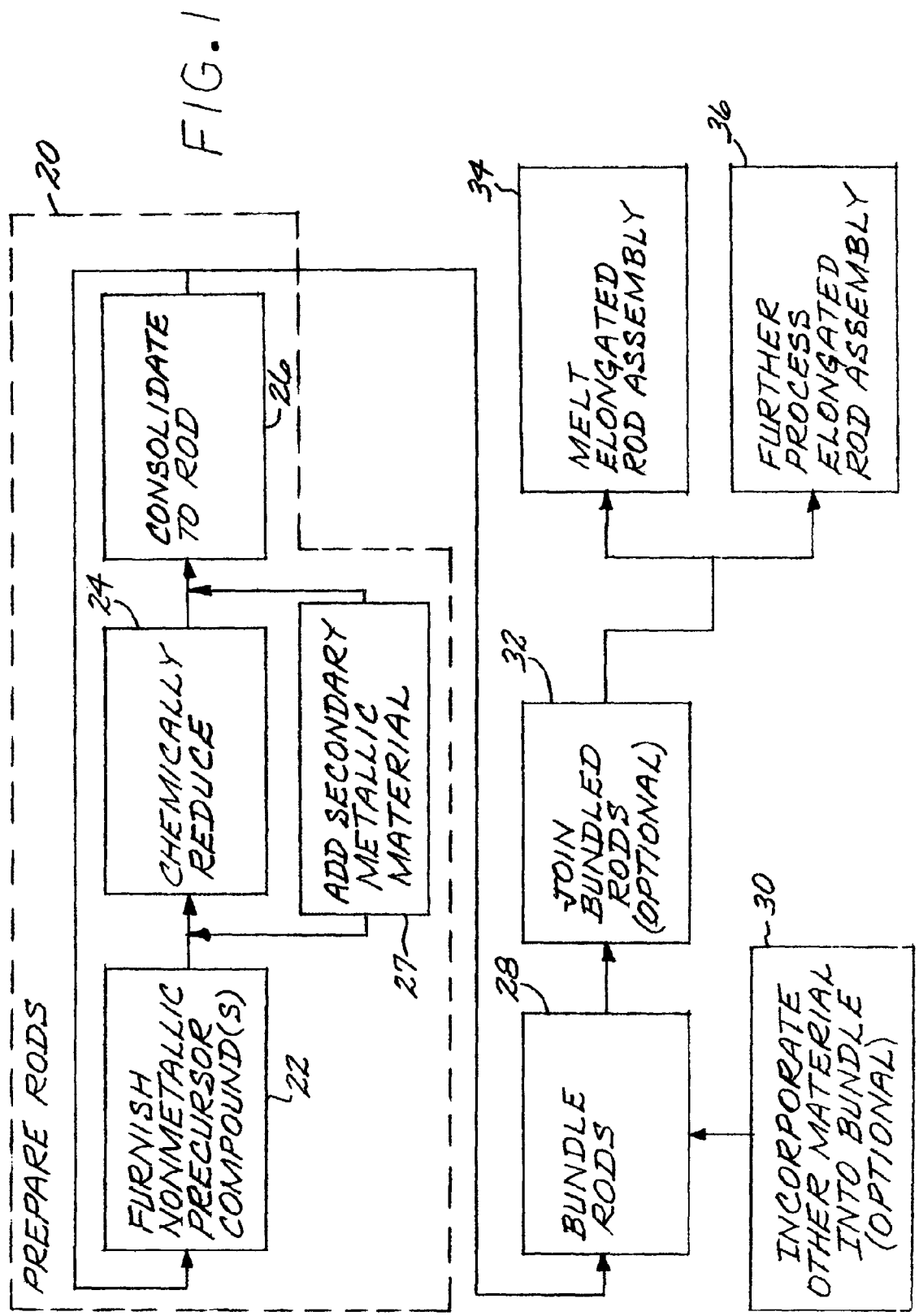
FIG. 1 is a block flow diagram of an embodiment of a method for making and using a rod assembly.
Figure 2:
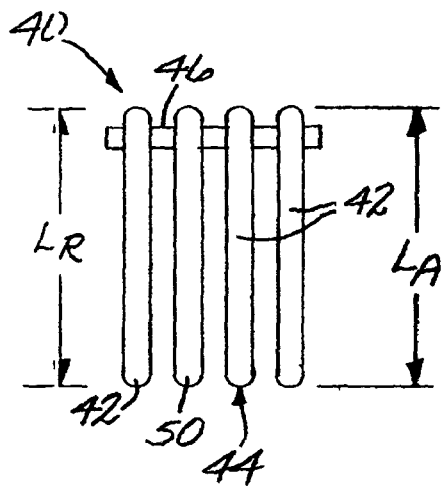
FIG. 2 is a schematic elevational view of a first embodiment of a rod assembly.
Figure 3:
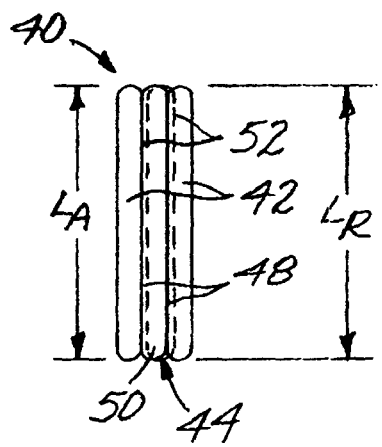
FIG. 3 is a schematic elevational view of a second embodiment of a rod assembly.

FIG. 1 illustrates a preferred approach for preparing an elongated rod assembly, and FIGS. 2-3 illustrate two embodiments of the elongated rod assembly 40. At least two, and preferably a plurality of, rods 42 are first individually prepared, step 20. The method comprises first providing one or more chemically reducible nonmetallic precursor compounds, step 22. "Nonmetallic precursor compounds" are nonmetallic compounds of the metallic material that eventually constitutes the rods 42. Any operable nonmetallic precursor compounds may be used. Reducible oxides of the metals are the preferred nonmetallic precursor compounds in solid-phase reduction, but other types of nonmetallic compounds such as sulfides, carbides, and nitrides are also operable. Reducible halides of the metals are the preferred nonmetallic precursor compounds in vapor-phase reduction.

The metal that is formed after the subsequent reduction has a base metal and optionally one or more alloying elements. The base metal is a metal that is present in a greater percentage by weight than any other element in the final metallic material. The base-metal precursor compound is present in an amount such that, after the chemical reduction to be described subsequently, there is more of the base metal present in the metal than any other element. In the preferred case, the base metal is titanium, and the base-metal precursor compound is titanium oxide, $TiO_2$ (for solid-phase reduction) or titanium tetrachloride (for vapor-phase reduction). The optional alloying element may be any element that is available in the chemically reducible form of the precursor compound or may be otherwise furnished. A few illustrative examples for titanium are aluminum, vanadium, molybdenum, chromium, zirconium, iron, niobium, and tungsten.

Where the final metallic material of the rods 42 is an alloy and no other metals are added to the rods as secondary metals or added as other rods, the nonmetallic precursor compounds are selected to provide the necessary metals in the final metallic article, and are mixed together in the proper proportions to yield the necessary proportions of these metals in the metallic article. (Some alloying elements termed "other additive constituents" may be added from sources other than the precursor compounds, as will be described subsequently. If other additive constituents are to be added, their amounts are taken into account in determining the proper proportions of the precursor compounds and the other additive constituents.) These precursor compounds are furnished and mixed together in the correct proportions such that the ratio of base metal and alloying additions in the mixture of precursor compounds is that required in the metallic material that forms the rods 42. If secondary metals or rods of other compositions are included in the rod assembly 40, the compositions of all of the materials in the rod assembly 40 are selected to have together the desired final composition.

The base-metal precursor compound and the alloying-element precursor compound(s) (where present) are finely divided solids or gaseous in form to ensure that they are chemically reacted in the subsequent step. The finely divided base-metal precursor compound and optional alloying-element precursor compounds may be, for example, powders, granules, flakes, or the like. For solid phase reduction, the preferred maximum dimension of the finely divided form is about 100 micrometers, although it is preferred that the maximum dimension be less than about 10 micrometers to ensure good reactivity.

In cases where the bundled rods are not subsequently melted, the present approach may be utilized in conjunction with thermophysically melt incompatible alloys, particularly where the final rods are to be used without subsequent melting. "Thermophysical melt incompatibility" and related terms refer to the basic concept that any identified thermophysical property of an alloying element is sufficiently different from that of the base metal, in the preferred case titanium, to cause detrimental effects in the melted final product. These detrimental effects include phenomena such as chemical inhomogeneity (detrimental micro-segregation, macro-segregation such as beta flecks in titanium-base alloys, and gross segregation from vaporization or immiscibility), inclusions of the alloying elements (such as high-density inclusions from elements such as tungsten, tantalum, molybdenum, and niobium), and the like. Thermophysical properties are intrinsic to the elements, and combinations of the elements, which form alloys, and are typically, envisioned using equilibrium phase diagrams, vapor pressure versus temperature curves, curves of densities as a function of crystal structure and temperature, and similar approaches. Although alloy systems may only approach predicted equilibrium, these envisioning data provide information sufficient to recognize and predict the cause of the detrimental effects as thermophysical melt incompatibilities. However, the ability to recognize and predict these detrimental effects as a result of the thermophysical melt incompatibility does not eliminate them. The present approach provides a technique to minimize and desirably avoid the detrimental effects by the elimination of melting in the preparation and processing of the alloy.

Thus, a thermophysical melt incompatible alloying element or elements in the alloy to be produced do not form a well mixed, homogeneous alloy with the base metal in a production melting operation in a stable, controllable fashion. In some instances, a thermophysically melt incompatible alloying element cannot be readily incorporated into the alloy at any compositional level, and in other instances the alloying element can be incorporated at low levels but not at higher levels. For example, in titanium iron does not behave in a thermophysically melt incompatible manner when introduced at low levels in titanium, typically up to about 0.3 weight percent, and homogeneous titanium-iron-containing alloys of low iron contents may be prepared. However, if iron is introduced at higher levels into titanium, it tends to segregate strongly in the melt and thus behaves in a thermophysically melt incompatible manner so that homogeneous alloys can only be prepared with great difficulty. In other examples, when magnesium is added to a titanium melt in vacuum, the magnesium immediately begins to vaporize due to its low vapor pressure, and therefore the melting cannot be accomplished in a stable manner. Tungsten tends to segregate in a titanium melt due to its density difference with titanium, making the formation of a homogeneous titanium-tungsten alloy extremely difficult.

The thermophysical melt incompatibility of the alloying element with a base metal may be any of several types. Because titanium is the preferred base metal, some illustrative examples for titanium are included in the following discussion.

One such thermophysical melt incompatibility is in the vapor pressure, as where the alloying element has an evaporation rate of greater than about 100 times that of titanium at a melt temperature, which is preferably a temperature just above the liquidus temperature of the alloy. Examples of such alloying elements in titanium include cadmium, zinc, bismuth, magnesium, and silver. Where the vapor pressure of the alloying element is too high, it will preferentially evaporate, as indicated by the evaporation rate values, when co-melted with titanium under a vacuum in conventional melting practice. An alloy will be formed, but it is not stable during melting and continuously loses the alloying element so that the percentage of the alloying element in the final alloy is difficult to control. In the present approach, because there is no vacuum melting, the high melt vapor pressure of the alloying element is not a concern.

Another such thermophysical melt incompatibility occurs when the melting point of the alloying element is too high or too low to be compatible with that of the base metal, as where the alloying element has a melting point different from (either greater than or less than) that of the base metal of more than about 400° C. (720° F.). Examples of such alloying elements in titanium include tungsten, tantalum, molybdenum, magnesium, and tin. If the melting point of the alloying element is too high, it is difficult to melt and homogenize the alloying element into the titanium melt in conventional vacuum melting practice. The segregation of such alloying elements may result in the formation of high-density inclusions containing that element, for example tungsten, tantalum, or molybdenum inclusions. If the melting point of the alloying element is too low, it will likely have an excessively high vapor pressure at the temperature required to melt the titanium. In the present approach, because there is no vacuum melting, the overly high or low melting points are not a concern.

Another such thermophysical melt incompatibility occurs when the density of the alloying element is so different from that of the base metal that the alloying element physically separates in the melt, as where the alloying element has a density difference with the base metal of greater than about 0.5 gram per cubic centimeter. Examples of such alloying elements in titanium include tungsten, tantalum, molybdenum, niobium, and aluminum. In conventional melting practice, the overly high or low density leads to gravity-driven segregation of the alloying element. In the present approach, because there is no melting there can be no gravity-driven segregation.

Another such thermophysical melt incompatibility occurs when the alloying element chemically reacts with the base metal in the liquid phase. Examples of such alloying elements in titanium include oxygen, nitrogen, silicon, boron, and beryllium. In conventional melting practice, the chemical reactivity of the alloying element with the base metal leads to the formation of intermetallic compounds including the base metal and the alloying element, and/or other deleterious phases in the melt, which are retained after the melt is solidified. These phases often have adverse effects on the properties of the final alloy. In the present approach, because the metals are not heated to the point where these reactions occur, the compounds are not formed.

Another such thermophysical melt incompatibility occurs when the alloying element exhibits a miscibility gap with the base metal in the liquid phase. Examples of such alloying elements in titanium include the rare earths such as cerium, gadolinium, lanthanum, and neodymium. In conventional melting practice, a miscibility gap leads to a segregation of the melt into the compositions defined by the miscibility gap. The result is inhomogeneities in the melt, which are retained in the final solidified article. The inhomogeneities lead to variations in properties throughout the final article. In the present approach, because the elements are not melted, the miscibility gap is not a concern.

Another, more complex thermophysical melt incompatibility involves the strong beta stabilizing elements that exhibit large liquidus-to-solidus gaps when alloyed with titanium. Some of these elements, such as iron, cobalt, and chromium, typically exhibit eutectic (or near-eutectic) phase reactions with titanium, and also usually exhibit a solid state-eutectoid decomposition of the beta phase into alpha phase plus a compound. Other such elements, such as bismuth and copper, typically exhibit peritectic phase reactions with titanium yielding beta phase from the liquid, and likewise usually exhibit a solid state eutectoid decomposition of the beta phase into alpha phase plus a compound. Such elements present extreme difficulties in achieving alloy homogeneity during solidification from the melt. This results not only because of normal solidification partitioning causing microsegregation, but also because melt process perturbations are known to cause separation of the beta-stabilizing-element-rich liquid during solidification to cause macro-segregation regions typically called beta flecks.

Another thermophysical melt incompatibility is not strictly related to the nature of the base metal, but instead to the crucibles or environment in which the base metal is melted. Base metals may require the use of a particular crucible material or melting atmosphere, and some potential alloying elements may react with those crucible materials or melting atmospheres, and therefore not be candidates as alloying elements for that particular base metal.

Another thermophysical melt incompatibility involves elements such as the alkali metals and alkali-earth metals that have very limited solubility in base-metal alloys. Examples in titanium include lithium and calcium. Finely divided dispersions of these elements, for example beta calcium in alpha titanium, may not be readily achieved using a melt process.

These and other types of thermophysical melt incompatibilities lead to difficulty or impossibility in forming acceptable alloys of these elements in conventional production melting. Their adverse effects are avoided in the present meltless approach for producing the rods 42.

The base-metal precursor compound and the optional alloying-element precursor compound(s) are mixed to form a uniform, homogeneous compound mixture, where an alloy is to be made. The mixing is performed by conventional procedures used to mix powders in other applications, for solid-phase reduction, or by the mixing of the vapors, for vapor-phase reduction.

Optionally, for solid-phase reduction of solid precursor compound powders the compound mixture is compacted to make a preform. This compaction is conducted by cold or hot pressing of the finely divided compounds, but not at such a high temperature that there is any melting of the compounds. The compacted shape may be sintered in the solid state to temporarily bind the particles together. The compacting desirably forms a shape similar to, but larger in dimensions than, the shape of the final article, or intermediate product form.

The mixture of nonmetallic precursor compounds is thereafter chemically reduced by any operable technique to produce an initial metallic material, in some cases and for some applications without melting the initial metallic material, step 24. As used herein, "without melting", "no melting", and related concepts mean that the material is not macroscopically or grossly melted, so that it liquefies and loses its shape. There may be, for example, some minor amount of localized melting as low-melting-point elements melt and are diffusionally alloyed with the higher-melting-point elements that do not melt. Even in such cases, the gross shape of the material remains unchanged.

In one approach, termed solid-phase reduction because the nonmetallic precursor compounds are furnished as solids, the chemical reduction may be performed by fused salt electrolysis. Fused salt electrolysis is a known technique that is described, for example, in published patent application WO 99/64638, whose disclosure is incorporated by reference in its entirety. Briefly, in fused salt electrolysis the mixture of nonmetallic precursor compounds is immersed in an electrolysis cell in a fused salt electrolyte such as a chloride salt at a temperature below the melting temperatures of the metals that form the nonmetallic precursor compounds. The mixture of nonmetallic precursor compounds is made the cathode of the electrolysis cell, with an anode. The elements combined with the metals in the nonmetallic precursor compounds, such as oxygen in the preferred case of oxide nonmetallic precursor compounds, are removed from the mixture by chemical reduction (i.e., the reverse of chemical oxidation). The reaction is performed at an elevated temperature to accelerate the diffusion of the oxygen or other gas away from the cathode. The cathodic potential is controlled to ensure that the reduction of the nonmetallic precursor compounds will occur, rather than other possible chemical reactions such as the decomposition of the molten salt. The electrolyte is a salt, preferably a salt that is more stable than the equivalent salt of the metals being refined and ideally very stable to remove the oxygen or other gas to a low level. The chlorides and mixtures of chlorides of barium, calcium, cesium, lithium, strontium, and yttrium are preferred. The chemical reduction may be carried to completion, so that the nonmetallic precursor compounds are completely reduced. The chemical reduction may instead be partial, such that some nonmetallic precursor compounds remain.

In another approach, termed vapor-phase reduction because the nonmetallic precursor compounds are furnished as vapors or gaseous phase, the chemical reduction may be performed by reducing mixtures of halides of the base metal and the alloying elements using a liquid alkali metal or a liquid alkaline earth metal. For example, titanium tetrachloride and the chlorides of the alloying elements are provided as gases. A mixture of these gases in appropriate amounts is contacted to molten sodium, so that the metallic halides are reduced to the metallic form. The metallic alloy is separated from the sodium. This reduction is performed at temperatures below the melting point of the metallic alloy. The approach, but without the present invention, is described more fully in U.S. Pat. Nos. 5,779,761 and 5,958,106, and US Patent Publication 2004/0123700, all of whose disclosures are incorporated by reference. Other gas-phase techniques are described in US Publications 2004/0050208 and 2004/0261573, whose disclosures are incorporated by reference.

The physical form of the initial metallic material at the completion of step 24 depends upon the physical form of the mixture of nonmetallic precursor compounds at the beginning of step 24. If the mixture of nonmetallic precursor compounds is free-flowing, finely divided particles, powders, granules, pieces, or the like, the initial metallic material is also in the same form, except that it is smaller in size and typically somewhat porous. If the mixture of nonmetallic precursor compounds is a compressed mass of the finely divided particles, powders, granules, pieces, or the like, then the physical form of the initial metallic material after step 24 is typically in the form of a somewhat porous metallic sponge. The external dimensions of the metallic sponge are smaller than those of the compressed mass of the nonmetallic precursor compound due to the removal of the oxygen and/or other combined elements in the reduction step 24. If the mixture of nonmetallic precursor compounds is a vapor, then the final physical form of the initial metallic material is typically fine powder that may be further processed.

Some constituents, termed "other additive constituents", may be difficult to introduce into the alloy. For example, suitable nonmetallic precursor compounds of the constituents may not be available, or the available nonmetallic precursor compounds of the other additive constituents may not be readily chemically reducible in a manner or at a temperature consistent with the chemical reduction of the other nonmetallic precursor compounds. It may be necessary that such other additive constituents ultimately be present as elements in solid solution in the alloy, as compounds formed by reaction with other constituents of the alloy, or as already-reacted, substantially inert compounds dispersed through the alloy. These other additive constituents or precursors thereof may be introduced from the gas, liquid, or solid phase, as may be appropriate, using one of the four approaches subsequently described or other operable approaches.

In a first approach, the other additive constituents are furnished as elements or compounds and are mixed with the precursor compounds prior to or concurrently with the step of chemically reducing. The mixture of precursor compounds and other additive constituents is subjected to the chemical reduction step 24, but only the precursor compounds are actually reduced and the other additive constituents are not reduced.

In a second approach, the other additive constituents in the form of solid particles are furnished but are not subjected to the chemical reduction treatment used for the base metal. Instead, they are mixed with the initial metallic material that results from the chemical reduction step, but after the step of chemically reducing 24 is complete. This approach is particularly effective when the step of chemically reducing is performed on a flowing powder of the precursor compounds, but it also may be performed using a pre-compacted mass of the precursor compounds, resulting in a spongy mass of the initial metallic material. The other additive constituents are adhered to the surface of the powder or to the surface of, and into the porosity of, the spongy mass. Solid particles may be optionally reacted in one or more steps if they are precursors to the other additive constituent.

In a third approach, the precursor is first produced as powder particles, or as a sponge by compacting the precursor compounds of the metallic elements. The particles are, or the sponge is, then chemically reduced. The other additive constituent is thereafter produced at the surfaces (external and internal, if the particles are spongelike) of the particles, or at the external and internal surfaces of the sponge, from the gaseous phase. In one technique, a gaseous precursor or elemental form (e.g., methane or nitrogen gas) is flowed over the surface of the particle or sponge to deposit the compound or element onto the surface from the gas. The material produced at the surfaces may be optionally reacted in one or more steps if they are precursors to the other additive constituent. The gas carrying the constituent of interest may be supplied in any operable manner, such as from a commercially available gas or by generating the gas such as by the electron beam vaporization of a ceramic or metal, or using a plasma.

A fourth approach is similar to the third approach, except that the other additive constituent is deposited from a liquid rather than from a gas. The precursor is first produced as powder particles, or as a sponge by compacting the precursor compounds of the metallic elements. The particles are, or the sponge is, then chemically reduced. The other additive constituent is thereafter produced at the surfaces (external and internal, if the particles are spongelike) of the particles, or at the external and internal surfaces of the sponge, by deposition from the liquid. In one technique, the particulate or sponge is dipped into a liquid solution of a precursor compound of the other additive constituent to coat the surfaces of the particles or the sponge. The precursor compound of the other additive constituent is second chemically reacted to leave the other additive constituent at the surfaces of the particles or at the surfaces of the sponge. In an example, lanthanum may be introduced into a titanium-base alloy by coating the surfaces of the reduced particles or sponge (produced from the precursor compounds) with lanthanum chloride. The coated particles are, or the sponge is, thereafter heated and/or exposed to vacuum to drive off the chlorine, leaving lanthanum at the surfaces of the particles or sponge. Optionally, the lanthanum-coated particles or sponge may be oxidized to form a fine lanthanum-oxygen dispersion, using oxygen from the environment or from solution in the metal, or the lanthanum-coated particles or sponge may be reacted with another element such as sulfur. In another approach, the constituent is electrochemically plated onto the particles or the sponge. In yet another approach, the particles or sponge may be dipped into a bath containing the other additive constituent, removed from the bath, and any solvent or carrier evaporated to leave a coating on the surface of the particle or sponge.

Whatever the chemical reduction technique used in step 24 and however the other additive constituent is introduced, the result is a mixture that comprises the alloy composition. Methods for introducing other additive constituents may be performed on precursors prior to the reduction of the base-metal constituent, or on already-reduced material. The metallic alloy may be free-flowing particles in some circumstances, or have a sponge-like structure in other cases. The sponge-like structure is produced in the solid-phase reduction approach if the precursor compounds have first been compacted together prior to the commencement of the actual chemical reduction. The precursor compounds may be compressed to form a compressed mass that is larger in dimensions than a desired final metallic article.

The chemical composition of the metallic material is determined by the types and amounts of the metals in the mixture of nonmetallic precursor compounds furnished in step 22, and by the other additive constituents that are introduced in the processing. The relative proportions of the metallic elements are determined by their respective ratios in the mixture of step 22 (not by the respective ratios of the compounds, but the respective ratios of the metallic element). In a case of most interest, the initial metallic material has more titanium than any other element as the base metal, producing a titanium-base initial metallic alloy. Other base metals of interest include nickel-base materials, iron-base materials, cobalt-base materials, and a titanium-base materials.

The initial metallic material is typically in a form that is not a rod. Accordingly and preferably, the initial metallic material produced in step 24 is thereafter consolidated to produce a consolidated metallic article in a rod form, without melting the initial metallic alloy and without melting the consolidated metallic material, step 26. The rod 42 may have any cross-sectional shape, but it is preferred that the rods 42 have shapes that are readily bundled, such as circles, hexagons, squares, rectangles, and the like. The consolidation removes porosity from the initial metallic alloy to a level suitable for subsequent applications. If the consolidated rod is to be used for remelting, a relative density of 30-80 percent may be typically sufficient. If the consolidated rod is to be used in some other application, a higher relative density may be desired. Any operable type of consolidation may be used. It is preferred that the consolidation be performed without a binder, which is an organic or inorganic material mixed with the powder to aid in adhering the powder particles to each other during the consolidation processing. The binder may leave an undesirable residue in the final structure, and its use is therefore preferably avoided.

Secondary metallic material may be introduced into rods 42, step 27. Such secondary metallic material may include, for example, revert material, scrap, or virgin metal such as master alloy. This secondary metallic material may be mixed with the nonmetallic precursor compounds prior to chemical reduction in step 24, and in this case only the nonmetallic precursor compounds are chemically reduced. This secondary metallic material may be mixed with the metallic material resulting from the chemical reduction step 24. In either case, the secondary metallic material is incorporated into the consolidated metallic material in step 26.

The consolidation 26 is performed by consolidating the initial metallic material under appropriate conditions of temperature and pressure, but at a temperature less than the melting points of the initial metallic alloy, the secondary metallic material, and the consolidated metallic article, if the consolidated rod is to be unmelted. The rods produced by the consolidation 26 need not be particularly strong or of high density, if in further processing they are melted or further consolidated. Examples of operable consolidation approaches include uniaxial or isostatic cold compaction, direct rolling, pressing, hot isostatic pressing, direct extrusion, containered extrusion, or the conform process. The consolidation reduces the external dimensions of the mass of initial metallic material, but such reductions in dimensions are predictable with experience for particular compositions. The consolidation 26 may also be used to achieve further alloying of the metallic article. For example, the can used in canned extrusion or hot isostatic pressing may not be evacuated so that there is a residual oxygen and nitrogen content, or a carbon-containing gas could be introduced into the can. Upon heating for the hot isostatic pressing, the residual oxygen, nitrogen, and/or carbon diffuses into and alloys with the titanium-base alloy.

The rods 42 are bundled together to form a rod bundle 44, step 28. The rods 42 are bundled together in a side-by-side fashion (not in an end-to-end fashion). At this point, other material may optionally be incorporated into the rod bundle 44, step 30. Such other material could be, for example, revert material, scrap, or virgin metal such as master alloy, in the form of a rod 50 of substantially equal length to the rods 42. The rods 42 may all be of the same composition, or some may be of different compositions. Previously melted metallic material, if available in a suitable rodlike form, may also be incorporated into the rod bundle 44 when the rod bundle is to be used for remelt applications.

The individual rods 42 and the rods 50, if any, may be left loose and not joined together. More preferably, to facilitate handling the individual rods 42 and the rods 50, if any, are joined together, step 32. For example, the individual rods 42 and rods 50, if any, of the rod bundle 44 may be joined at one or both ends, or at intermediate locations along their lengths, by a mechanical attachment 46 as shown in FIG. 2. The individual rods 42 and the rods 50, if any, may instead be joined together by welding the individual rods 42 and the rods 50, if any, to adjacent individual rods 42 and/or rods 50, if any, at one or more points along their lateral surfaces 48, or by extruding hot isostatic pressing, or otherwise joining the rod bundle 44 as shown in FIG. 3. The rods 42 and the rods 50, if any, may have longitudinally extending keyways 52 therein to aid in assembling the rods 42 and 50 to form the rod bundle 44. One or more rod bundles, taken together, form the elongated rod assembly 40. That is, it is not necessary to weld or otherwise join rods 42 in an end-to-end fashion. It may be necessary to weld the rods 42 and 50, where used, to the mechanical attachment 46, where used, but this weld is typically not melted in subsequent processing.

The rods 42 produced in step 26 each has a rod length $L_R$ substantially equal to the assembly length $L_A$, although there may be some variation in length among the rods 42.

Figure 4:
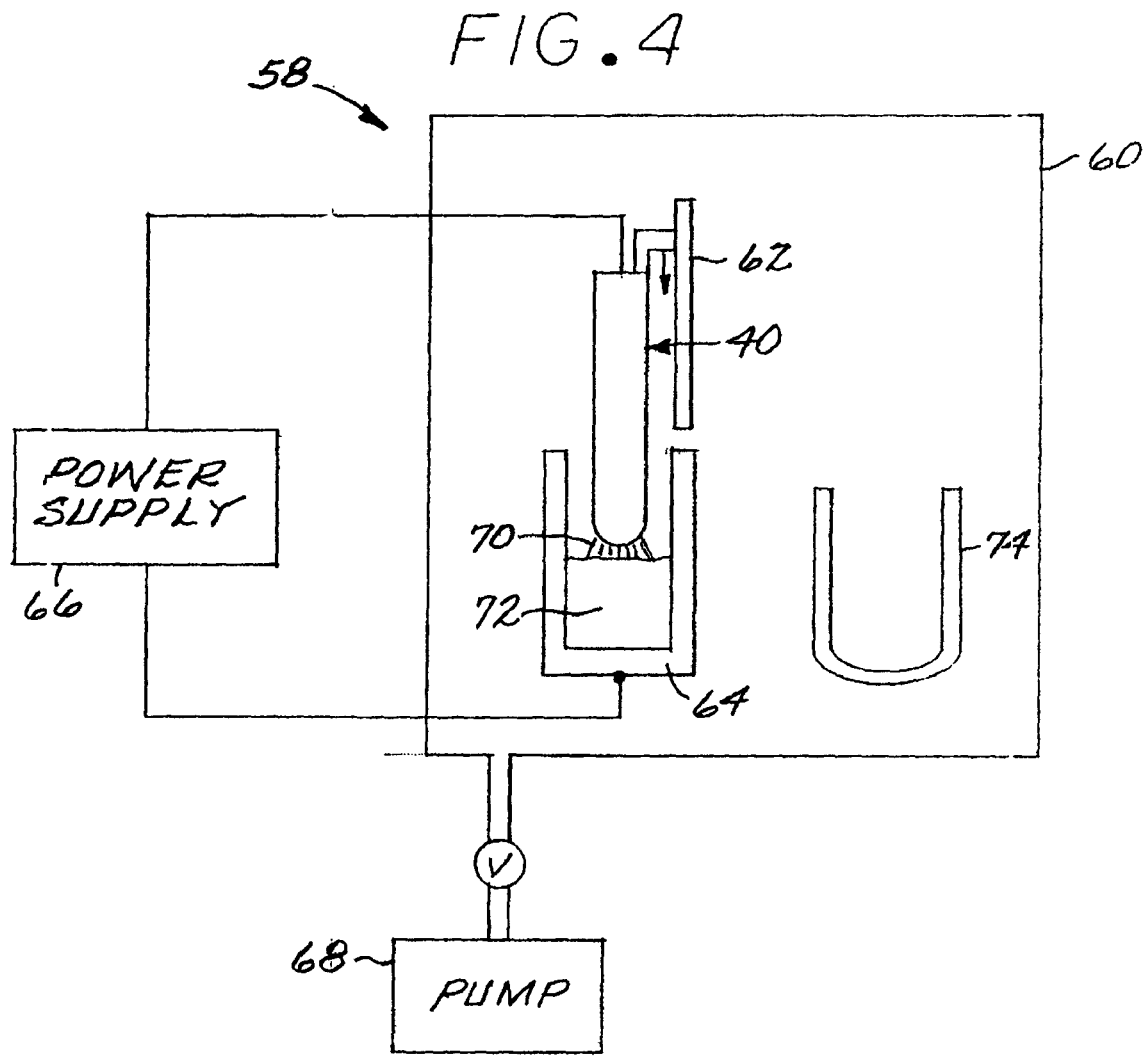
FIG. 4 is a schematic sectional view of a vacuum melting processor using a rod assembly.

The rod assembly 40 may be used as a consumable feedstock and subsequently melted, step 34, in a suitable melting apparatus, an example of which is a vacuum arc melting apparatus 58 as depicted in FIG. 4, and then cast. The rod assembly 40 is vertically movably supported in a vacuum chamber 60 on a track 62 that allows the rod assembly 40 to be controllably moved downwardly. The rod assembly 40 is movably supported above a melting crucible 64. An electrical power supply 66 is connected between the rod assembly 66 and the melting crucible 64. The vacuum chamber 60 is evacuated by a pump 68. An electrical arc 70 is struck between the lower end of the rod assembly 40 and the melting crucible 64. The electrical arc 70 melts the lower end of the rod assembly 40 to form a molten pool 72. The rod assembly 40 is then progressively lowered on the track 62 so that additional portions of the lower end of the rod assembly 40 are melted and added to the molten pool 72. Eventually, all or most of the rod assembly 40 is melted into the molten pool 72. The metal of the molten pool 72 is then solidified as an electrode or cast into a casting mold 74 such as an ingot mold or a continuous-casting mold, and solidified. The resulting casting may be used directly, or it may be remelted one or more times.

The elongated rod assembly 40 may instead be further processed by other techniques, step 36, for use in applications other than a melt application. For example, the elongated rod assembly may be extruded, hot isostatically pressed, rolled, or the like. In this case, it is strongly preferred that none of the material in the rod assembly 40 used in step 36 be previously melted, and the rod assembly 40 is not melted in step 36.

However the rod assembly 40 is processed in steps 34 and 36, the present approach has the important virtue that the rod assembly 40 is of a uniform, controllable length, and of a uniform, controllable cross-sectional configuration. This uniformity is important in a production processing environment so that the rod assembly 40 may be handled by machinery that is tailored for handling the uniform rod assemblies. Additionally, the rod assembly 40 does not have transverse welds or other joints along its length that could break during the subsequent processing 34 or 36.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for making a melted ingot comprising the steps of:
preparing at least two rods, wherein for each rod the step of preparing includes the steps of
furnishing at least one nonmetallic precursor compound, the at least one nonmetallic precursor compound being capable of forming reduced metallic alloy particles when chemically reduced; thereafter
chemically reducing the precursor compound to produce the reduced metallic alloy particles having multiple metallic elements without melting the metallic alloy particles, the metallic alloy particles being Ti-based particles; and thereafter
consolidating the reduced metallic alloy particles to form a consolidated rod without melting the consolidated rod;
bundling the consolidated rods together to form a bundled rod assembly having an assembly length, the bundled rod assembly being configured for use as a melt electrode; and
arranging and disposing the bundled rod assembly into a melt electrode assembly and melting the bundled rod assembly to form an ingot.

2. The method of claim 1, wherein the step of bundling includes the step of
joining the rods along their lateral surfaces.

3. The method of claim 1, wherein the step of bundling includes the step of incorporating at least one rod into the bundle which was not made by the step of preparing, wherein the added rod has an added rod length equal to the assembly length.

4. The method of claim 1, wherein the step of incorporating at least one rod into the bundle includes the step of incorporating a rod made by consolidating at least one material from the group consisting of machining chips and master alloy.

5. The method of claim 1, wherein the step of using the bundled rod assembly as a melt electrode to form an ingot includes melting the bundled rod assembly by a consumable electrode melting process starting at one end of the rod assembly.

6. The method of claim 5, wherein the step of melting includes the step of melting by a consumable electrode melting process selected from the group consisting of vacuum arc remelting and electro-slag remelting.

7. The method of claim 1 wherein the step of using the bundled rod assembly as a melt electrode to form an ingot includes melting the bundled rod assembly to form a casting.

8. The method of claim 1, wherein the step of preparing at least two rods includes the step of introducing an other additive constituent into the rods by introducing a material to the non metallic precursor compound before the step of reducing.

9. The method of claim 1, wherein the step of preparing at least two rods includes the step of introducing an other additive constituent into the rods by introducing a material into the metallic alloy particles after the step of reducing and before the step of consolidating.

10. A method for making consolidated metallic alloy article without melting the consolidated metallic alloy article comprising the steps of:
preparing at least two rods, wherein for each rod the step of preparing includes the steps of
furnishing more than one nonmetallic precursor compound, the at least one nonmetallic precursor compound being capable of forming reduced metallic alloy particles when chemically reduced; thereafter
chemically reducing the precursor compounds to produce the reduced metallic alloy particles having multiple metallic elements without melting the metallic alloy particles, the metallic alloy particles being Ti-based particles; and thereafter
consolidating the reduced metallic alloy particles to form a consolidated rod without melting the consolidated rod; and
bundling the consolidated rods together to form a bundled rod assembly having an assembly length; and
consolidating the bundled rod assembly to form a consolidated metallic alloy article without melting the metallic alloy particles and without melting the rods.

11. The method of claim 10, wherein the step of furnishing includes the step of furnishing at least one nonmetallic precursor compound comprising at least one thermophysically melt incompatible element.

12. The method of claim 10, wherein the step of consolidating the bundled rod assembly includes consolidating by a method selected from the group consisting of hot isostatic pressing, cold pressing, and containered extrusion.

13. The method of claim 10, wherein an additional step after the step of consolidating is performed wherein the consolidated metallic alloy article is further processed by a method selected from the group consisting of forging, extrusion, machining, and heat treating without melting the metallic alloy article.

14. The method of claim 10, wherein the step of preparing rods includes the step of introducing an other additive constituent into the rods by introducing a material to the non metallic precursor compound before the step of reducing.

15. The method of claim 10, wherein the step of preparing rods includes the step of introducing an other additive constituent into the rods by introducing a material into the metallic alloy particles after the step of reducing and before the step of consolidating.

16. The method of claim 10, consolidating the reduced metallic alloy material includes consolidating without a binder.

17. A method for making a melted ingot comprising the steps of:
preparing at least two rods, wherein for each rod the step of preparing includes the steps of
furnishing at least one nonmetallic precursor compound, the at least one nonmetallic precursor compound being capable of forming reduced metallic alloy particles when chemically reduced; thereafter
chemically reducing the precursor compound to produce the reduced metallic alloy particles having multiple metallic elements without melting the metallic alloy particles; and thereafter
consolidating the reduced metallic alloy particles to form a consolidated rod without a binder and without melting the consolidated rod;
bundling the consolidated rods together to form a bundled rod assembly having an assembly length, the bundled rod assembly being configured for use as a melt electrode; and
arranging and disposing the bundled rod assembly into a melt electrode assembly and melting the bundled rod assembly to form an ingot.

18. The method of claim 17, wherein the step of chemically reducing includes the step of:
producing the metallic material selected from the group consisting of a nickel-based material, an iron-based material, a cobalt-based material, and a titanium-based material.

19. The method of claim 17, wherein the step of bundling includes the step of joining the rods along their lateral surfaces.

20. The method of claim 17, wherein the step of bundling includes the step of incorporating at least one rod into the bundle which was not made by the step of preparing, wherein the added rod has an added rod length equal to the assembly length.

21. The method of claim 17, wherein the step of incorporating at least one rod into the bundle includes the step of incorporating a rod made by consolidating at least one material from the group consisting of machining chips and master alloy.

22. The method of claim 17, wherein the step of using the bundled rod assembly as a melt electrode to form an ingot includes melting the bundled rod assembly by a consumable electrode melting process starting at one end of the rod assembly.

23. The method of claim 22, wherein the step of melting includes the step of melting by a consumable electrode melting process selected from the group consisting of vacuum arc remelting and electro-slag remelting.

24. The method of claim 17, wherein the step of using the bundled rod assembly as a melt electrode to form an ingot includes melting the bundled rod assembly to form a casting.

25. The method of claim 17, wherein the step of preparing at least two rods includes the step of introducing an other additive constituent into the rods by introducing a material to the non metallic precursor compound before the step of reducing.

26. The method of claim 17, wherein the step of preparing at least two rods includes the step of introducing an other additive constituent into the rods by introducing a material into the metallic alloy particles after the step of reducing and before the step of consolidating.

* * * * *